United States Patent
Bürkner

(10) Patent No.: US 11,305,503 B2
(45) Date of Patent: Apr. 19, 2022

(54) METHOD FOR PRODUCING A WIND TURBINE ROTOR BLADE, AND WIND TURBINE ROTOR BLADE

(71) Applicant: Wobben Properties GmbH, Aurich (DE)

(72) Inventor: Falko Bürkner, Bremen (DE)

(73) Assignee: Wobben Properties GmbH, Aurich (DE)

( * ) Notice: Subject to any disclaimer, the term of this patent is extended or adjusted under 35 U.S.C. 154(b) by 45 days.

(21) Appl. No.: 16/471,946

(22) PCT Filed: Dec. 15, 2017

(86) PCT No.: PCT/EP2017/083004
§ 371 (c)(1),
(2) Date: Jun. 20, 2019

(87) PCT Pub. No.: WO2018/114659
PCT Pub. Date: Jun. 28, 2018

(65) Prior Publication Data
US 2020/0001562 A1    Jan. 2, 2020

(30) Foreign Application Priority Data
Dec. 22, 2016 (DE) ............... 10 2016 125 452.5

(51) Int. Cl.
*B29D 99/00* (2010.01)
*B29C 53/58* (2006.01)
(Continued)

(52) U.S. Cl.
CPC ........ *B29D 99/0028* (2013.01); *B29C 53/585* (2013.01); *B29C 53/62* (2013.01);
(Continued)

(58) Field of Classification Search
CPC ... B29D 99/0028; B29C 53/585; B29C 53/62; F05B 2240/302; F03D 13/10
See application file for complete search history.

(56) References Cited

U.S. PATENT DOCUMENTS 3,962,506 A * 6/1976 Dunahoo ............... B29D 22/00
428/158
7,883,321 B2    2/2011 Bertelsen
(Continued)

FOREIGN PATENT DOCUMENTS

CN    101668945 A    3/2010
CN    102076485 A    5/2011
(Continued)

OTHER PUBLICATIONS

Kong et al., "Structural investigation of composite wind turbine blade considering various load cases and fatigue life", Energy 30(2005), p. 2101-2114.

*Primary Examiner* — Timothy Kennedy
*Assistant Examiner* — Alexander A Wang
(74) *Attorney, Agent, or Firm* — Seed Intellectual Property Law Group LLP

(57) ABSTRACT

A method of producing a wind turbine rotor blade. The wind turbine rotor blade has at least an inner blade portion and an outer blade portion, as well as a connecting element. The inner blade portion is wound on a winding form having a first and a second winding portion. The first and second winding portions are releasably fixed to each other by way of a screw connection. The second winding portion is of a conical configuration so that after winding of the inner blade portion a sleeve is produced at an end of the inner blade portion.

3 Claims, 12 Drawing Sheets

(51) Int. Cl.
*B29C 53/62* (2006.01)
*B29C 70/32* (2006.01)
*F03D 1/06* (2006.01)

(52) U.S. Cl.
CPC ............ *B29C 70/32* (2013.01); *F03D 1/0675* (2013.01); *F05B 2230/30* (2013.01); *F05B 2240/30* (2013.01); *F05B 2240/302* (2013.01); *F05B 2280/6002* (2013.01); *F05B 2280/6003* (2013.01)

(56) References Cited

U.S. PATENT DOCUMENTS

| | | | |
|---|---|---|---|
| 8,221,085 | B2 | 7/2012 | Livingston et al. |
| 9,168,705 | B2 | 10/2015 | Bendel et al. |
| 2007/0253824 | A1 | 11/2007 | Eyb |
| 2007/0253825 | A1 | 11/2007 | Bruce et al. |
| 2009/0114337 | A1* | 5/2009 | Llorente Gonzalez ..................... B29C 70/32 156/185 |
| 2009/0169390 | A1 | 7/2009 | Nies |
| 2012/0279636 | A1 | 11/2012 | Peters et al. |
| 2014/0169978 | A1 | 6/2014 | Livingston |
| 2015/0266250 | A1* | 9/2015 | Hoffmann .......... B29D 99/0028 415/200 |

FOREIGN PATENT DOCUMENTS

| | | |
|---|---|---|
| CN | 104812552 A | 7/2015 |
| DE | 3239804 A1 | 7/1983 |
| DE | 19906618 A1 | 8/2000 |
| DE | 102008055513 B4 | 3/2016 |
| RU | 2115594 C1 | 7/1998 |
| SU | 1822396 A3 | 6/1993 |
| WO | 2014/072120 A1 | 5/2014 |

* cited by examiner

METHOD FOR PRODUCING A WIND TURBINE ROTOR BLADE, AND WIND TURBINE ROTOR BLADE

BACKGROUND

Technical Field

The present invention concerns a method of producing a wind turbine rotor blade and a wind turbine rotor blade.

Description of the Related Art

US 2007/0253824 A1 discloses a modular rotor blade of a wind turbine. The rotor blade is of a two-part configuration and has an inner blade portion and an outer blade portion. The inner blade portion and the outer blade portion can be fixed to each other or fixed together by means of a connecting element. Transport of the rotor blade can be considerably simplified by virtue of the multi-part structure of the rotor blade. The connection between the inner blade portion and the outer blade portion is effected by vacuum infusion. Vacuum infusion at that location however is difficult and time-consuming.

On the German patent application from which priority is claimed the German Patent and Trade Mark Office searched the following documents: US 2007/0253825 A1, DE 32 39 804 A1, DE 10 2008 055 513 B4 and US 2014/0169978 A1.

BRIEF SUMMARY

Provided is a wind turbine rotor blade which is of a multi-part configuration and which has an improved connection between the respective parts.

Provided is a method of producing a wind turbine rotor blade. The wind turbine rotor blade has at least an inner blade portion and an outer blade portion, as well as a connecting element. The inner blade portion is wound on a winding form having a first and a second winding portion. The first and second winding portions are releasably fixed to each other by way of a screw connection. The second winding portion is of a conical configuration so that after winding of the inner blade portion a sleeve is produced at an end of the inner blade portion.

According to an aspect of the present invention the connecting element is wound on a winding form. The connecting element has a first and a second portion.

According to a further aspect of the present invention a form having a conical internal shape is pushed on to the first portion of the connecting element before the winding laminate is hardened in order to provide a first portion of a conical configuration and having a smooth surface.

According to a further aspect of the present invention the at least one inner blade portion and the at least one outer blade portion are releasably connected together or adhesively bonded together by way of the connecting element.

Provided is a wind turbine rotor blade comprising an inner blade portion, an outer blade portion, and a connecting element for connecting the inner blade portion and the outer blade portion. The inner blade portion has a sleeve at a first end, which is achieved by winding of the inner blade portion. The at least one inner blade portion and at least one outer blade portion can be fixed together by way of a screw connection so that the inner blade portion is fixed to the outer blade portion by way of the connecting element.

In a further aspect of the present invention the inner blade portion can have at least one first web which is glued thereto.

The connecting element is introduced into the sleeves of the inner blade portion with its first end which has a second web glued therein. The second end of the connecting element can be glued in an end of the outer blade portion.

The wind turbine rotor blade is at least of a two-part configuration and has an inner blade portion and an outer blade portion. The inner blade portion has for example the rotor blade root and is secured to a hub of the wind turbine. At an opposite end the inner blade portion has a receiving unit or sleeve into which a connecting element can be partially introduced. The rotor blade further has an outer blade portion which can be fixed to the inner blade portion by means of the connecting element.

The wind turbine rotor blade makes it is possible to avoid complicated and laborious milling operations at both sides of the blade separation junction. In addition complicated and expensive flange laminates can be avoided in the region of the outer blade.

According to an aspect of the present invention the blade separation junction can also be displaced outwardly. That makes it possible to better divide up the units for transport. Furthermore inexpensive inner blade production can be expanded by virtue of the winding laminate. In addition quicker assembly can be made possible on the building site. Finally, it is also possible to avoid a thickening of the profile configuration, as in the case of a classic transverse bolt connection.

According to an aspect of the present invention a contact plane between the sleeve of the inner blade portion and the push-in member (connecting element) is of a conical configuration involving a given angle in order to permit clean assembly and separation of the connection. A gap can be defined by virtue thereof between the inner blade and the outer blade. That concerns the position of the blade parts in the longitudinal direction after being fitted together and braced in position. Furthermore the cross-section of the contact plane can be not round but for example elliptical in order also to be able to better transmit torsional loads without having to rely only on frictional forces. Furthermore the contact plane can be of such a configuration that only two regions are in contact at the beginning and at the end in the longitudinal direction. That can provide for load transfer in a more defined and more predictable fashion. The regions of high accuracy are reduced and the clamping action by virtue of the biasing effect is enhanced. By virtue of the precise shaping of the sleeve by virtue of a precisely manufactured winding form it is possible to provide that the surfaces are of the desired shape without having to be subsequently milled.

The precise shaping of the push-in member (connecting element) can be achieved by a precisely produced negative form which is pushed on to the winding laminate which has been freshly wound and has not yet hardened without having to mill the surface after hardening to impart the desired shape.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
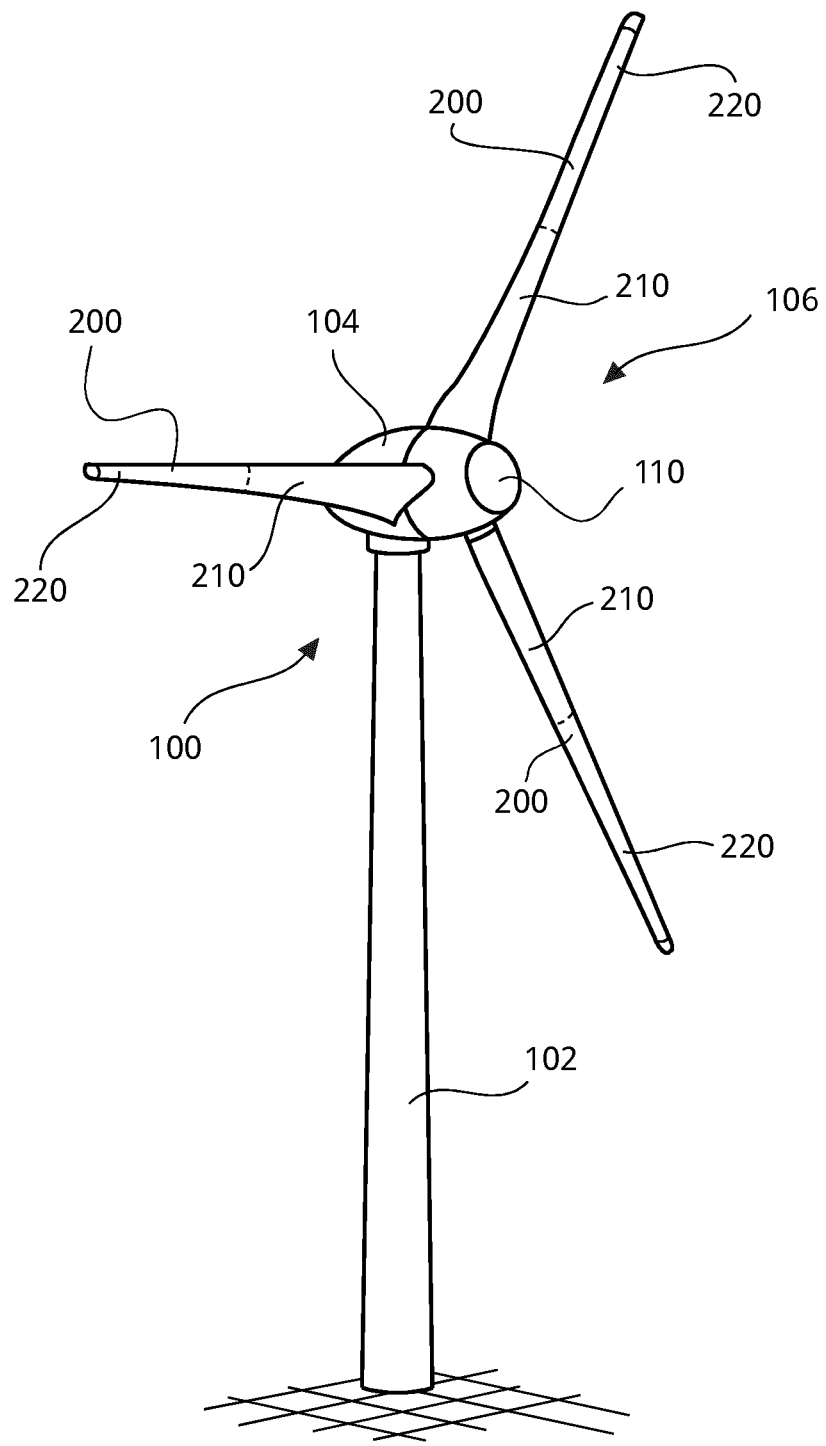
FIG. 1 shows a diagrammatic view of a wind turbine according to the invention.

FIG. 1 shows a diagrammatic view of a wind turbine. The wind turbine 100 has a tower 102 and a pod 104. A rotor 106 having three rotor blades 200 and a spinner 110 is provided on the pod 104. The rotor 106 is driven in rotation in operation by the wind and drives a generator in the pod 104 to generate electric energy.

The rotor blade 200 has at least two parts, namely an inner blade portion 210 and an outer blade portion 220. The outer blade portion 220 is fixed to the inner blade portion 210.

Figure 2:
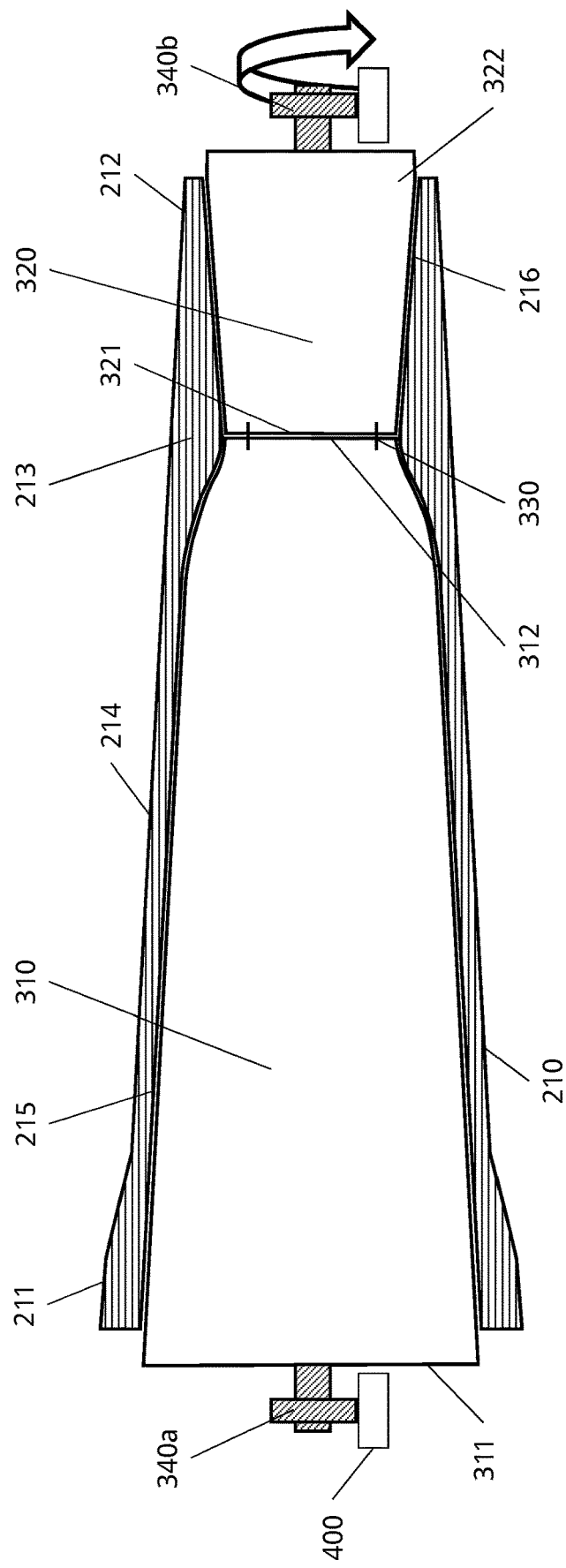
FIG. 2 shows a diagrammatic view of an inner blade portion during manufacture thereof.

FIG. 2 shows a diagrammatic sectional view of an inner blade portion during manufacture thereof. The inner blade portion 210 is wound. For that purpose there is provided a winding core with a first winding form 310 and a second winding form 320 which are fixed to each other or connected together by way of an interface 330. The first winding form portion 310 is supported by way of a bearing 340a and the second winding form portion 320 is supported by way of a further bearing 340b so that the winding core can rotate.

The first winding portion 320 has a first end 311 and a second end 312. The first end 311 is coupled to the bearing 340a. The second end 312 is coupled by way of the connecting interface 330 to a first end 321 of the second winding portion 320. By way of example the first and second winding portions 310, 320 can be releasably fixed to each other by way of a screw connection. Optionally the diameter of the first winding portion 310 can decrease from the first end 311 to the second end 312. The diameter of the second winding portion 320 can increase from the first end 321 to the second end 322. Thus the winding core can be of the smallest diameter in the region of the interface 330. That configuration of the winding core can provide that an inner blade portion with an undercut configuration 213 can be produced.

Fiber composite fabrics are wound on to the winding form 310, 320. After the inner blade portion 210 has been produced the screw connection in the region of the interface 330 can be released and the first and second winding portions 310, 320 can be separated out so that only the inner blade portion 210 in particular with the undercut configuration 213 remains. The inner blade portion 210 has a first end 211 and a second end 212. A thickening of the winding material or a flange thickening for a transverse bolt connection (for example in relation to the rotor hub) can be provided in the region of the first end 211.

The second winding portion 320 can be provided in the form of a sleeve shape in order to provide a sleeve in the region of the second end 212 of the inner blade portion. That sleeve serves in particular to receive an end of the connecting element.

According to an aspect of the present invention the first and second winding portions 310, 320 can be made from a metal like for example steel. That is particularly advantageous because it is possible in that way to provide a smooth surface on the first and second winding portions 310, 320. In particular the smooth surface of the first and/or second winding portion 320 can provide a smooth inside surface 215, 216 and in particular a sleeve portion in the region of the second end 212 of the inner blade portion which is also smooth.

Figure 3:
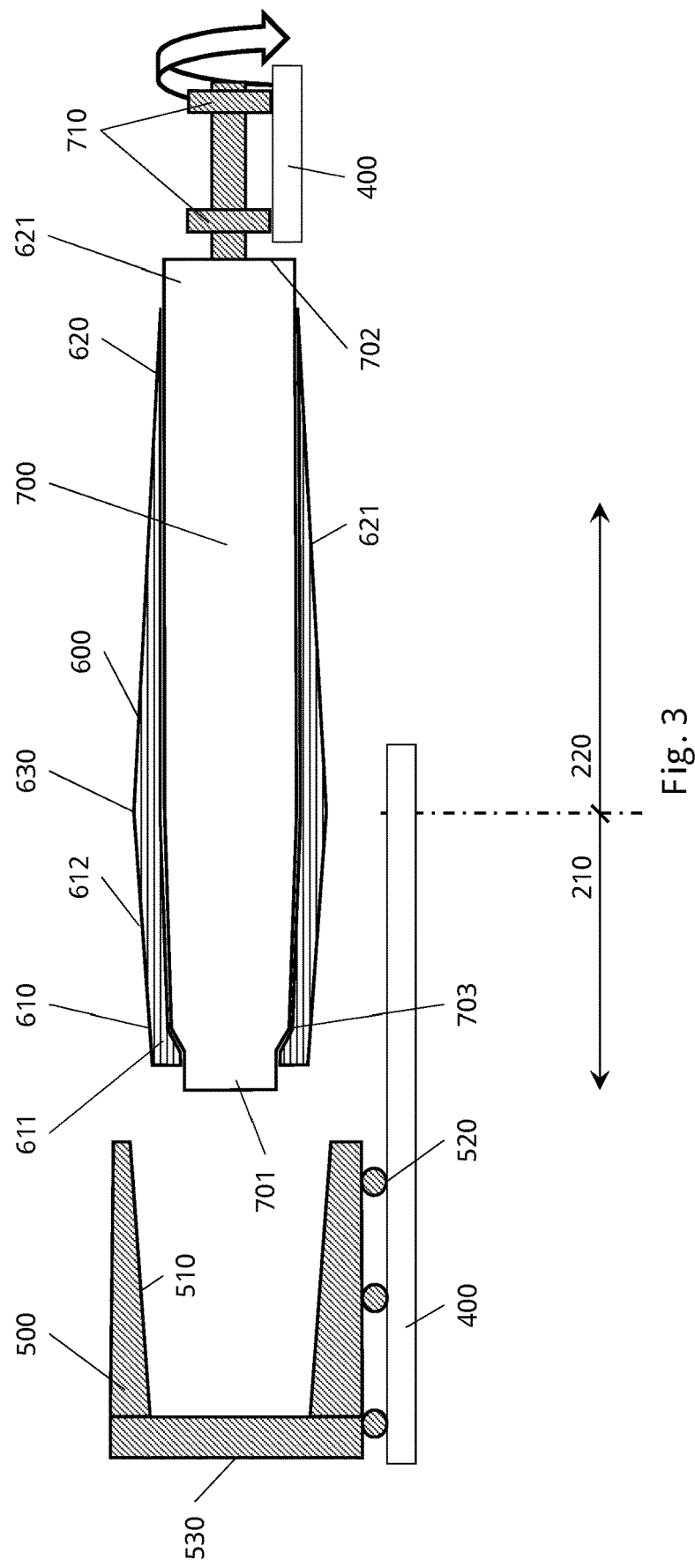
FIG. 3 shows a diagrammatic sectional view of a connecting element upon manufacture thereof.

FIG. 3 shows a diagrammatic sectional view of a connecting element upon manufacture thereof. A winding form 700 is provided for producing a connecting element 600 which for example can be in the form of a connecting beam. The winding form 700 has a first and a second end 701, 702 as well as a transitional portion 703. The outside diameter of the winding form 700 is increased in the region between the transition of the first end 701 and the transitional region 703. Fiber-darkening material can be wound on to the winding form 700 which is supported for example by means of bearing 710 on a foundation 400 by rotation of the winding form 700 in the material.

The connecting element 600 has a first end 611 and a second end 621. In addition the connecting element 600 has a first portion 610 in the region of the first end 611 and a second portion 620 in the region of the second portion 610, 620. A central portion 630 is provided between those two portions 610, 620.

In order to achieve a smooth surface for the first portion 610 a steel form 500 can be provided for example on wheels 520. The steel form 500 is of an inside diameter 510 which narrows to a closed end 530. After the winding element 600 has been wound and before the material has hardened the steel form 500 is pushed on to the first end 610 so that the insides of the steel form bear against the first portion 610. In that way the outer region of the first portion 610 can be produced as being very smooth.

Figure 4:
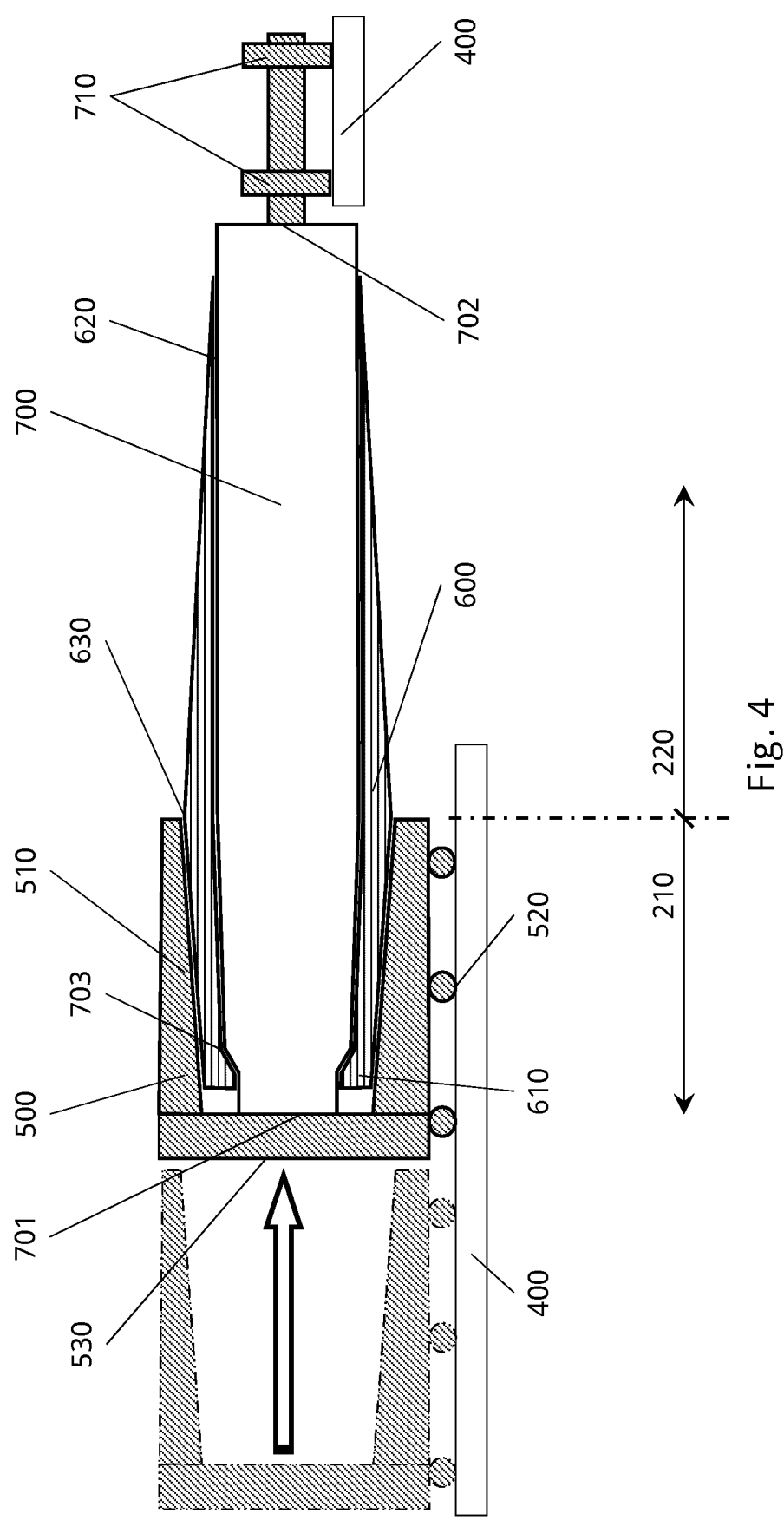
FIG. 4 shows a diagrammatic side view of a connecting element during manufacture thereof.

FIG. 4 shows a diagrammatic sectional view of a connecting element during manufacture thereof. FIG. 4 shows how the steel form 500 has been pushed on to the first portion 610 of the connecting element 600 while the winding material of the connecting element 600 is still on the winding form 700.

Figure 5:
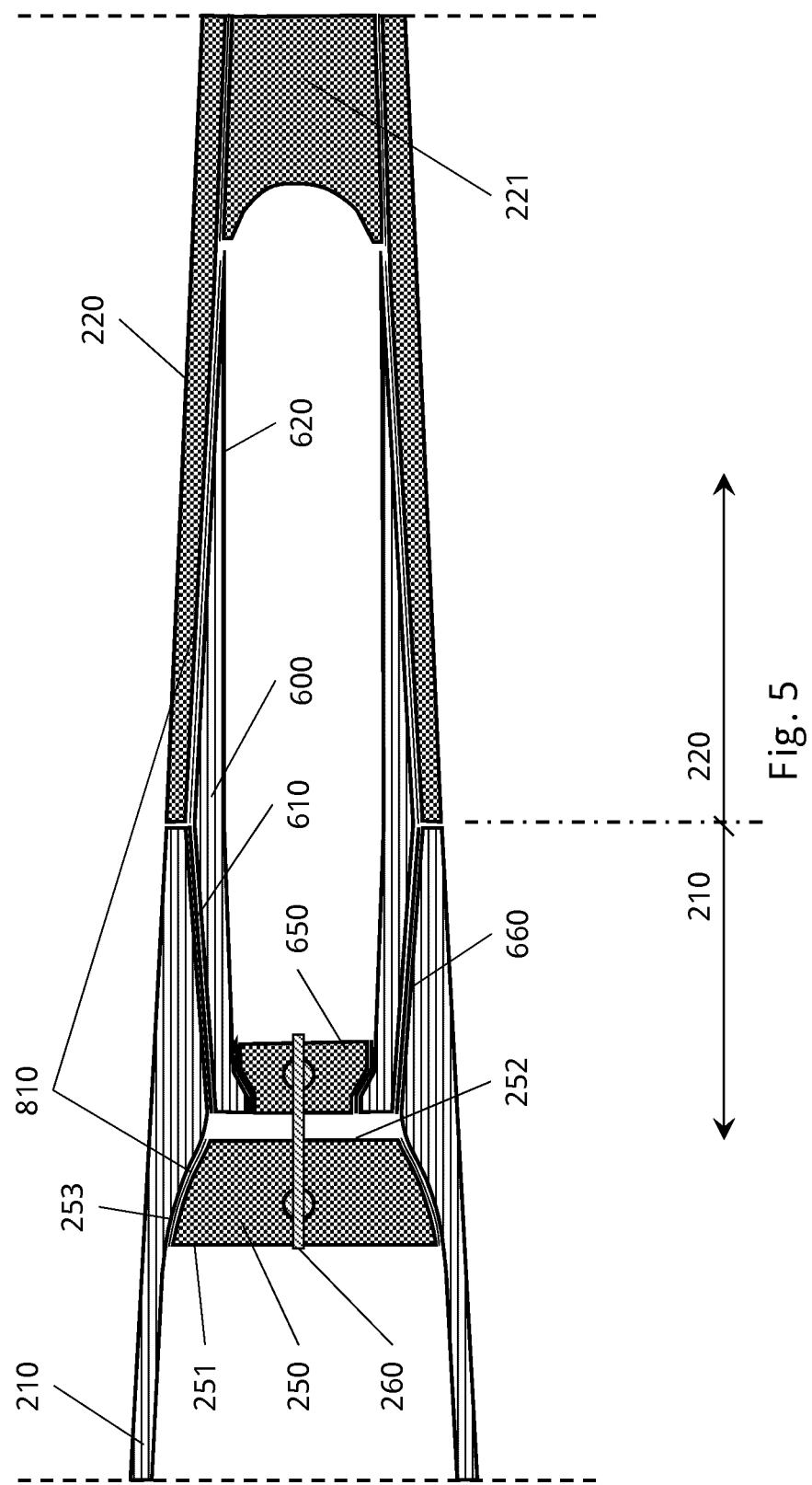
FIG. 5 shows a diagrammatic sectional view of a part of a wind turbine rotor blade.

FIG. 5 shows a diagrammatic sectional view of a part of a wind turbine rotor blade. FIG. 5 shows in particular a blade separation junction between the inner blade portion 210 and the outer blade portion 220. The connection between the inner blade portion 210 and the outer blade portion 220 is made by way of the connecting unit 600. The connecting unit 600 has a first portion 610 which has been produced as described with reference to FIGS. 3 and 4 and preferably has a smooth surface. The first portion 610 is introduced into the sleeve 212 of the inner blade portion 210.

The connecting element 600 can have a web 650 which is glued therein. A further web 250 can be glued in place in the region of the thickening portion or the undercut configuration 213. The two webs 650, 250 can be screwed together or fixed to each other by means of a transverse bolt 260. The second portion 620 of the connecting unit is pushed into an open end of the outer blade 220 and preferably glued by means of an adhesive 810.

In optimum fashion an anti-friction coating 660 can be provided in the region of the sleeve. The first end of the connecting element can thus be pushed into the sleeve portion 212 and fixed by means of the webs 250, 650 and the transverse bolt 260.

That makes it possible to achieve a reversible fixing option between the inner blade portion and the outer blade portion.

Figure 6:
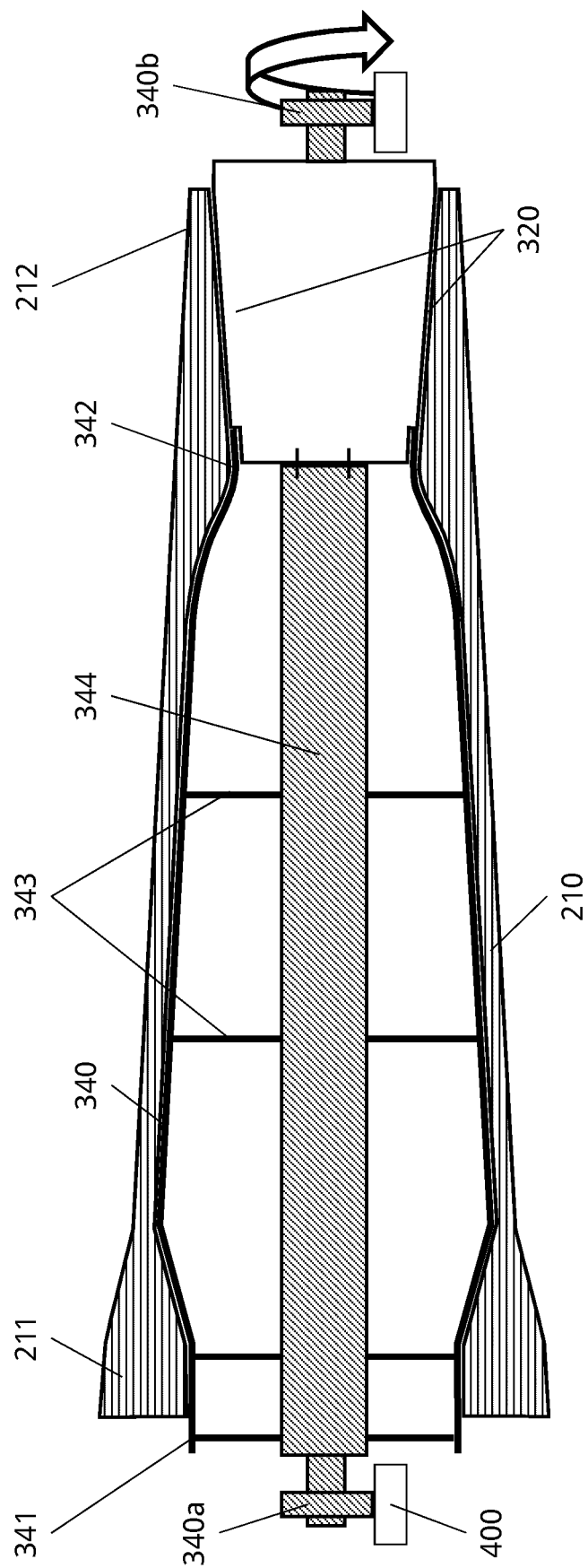
FIG. 6 shows a diagrammatic sectional view of an inner blade portion during manufacture thereof.

FIG. 6 shows a diagrammatic sectional view of an inner blade portion during manufacture thereof. FIG. 6 shows an alternative winding form 340 in relation to the winding form shown in FIG. 2. While the winding form in FIG. 2 comprises steel, the winding form 340 in FIG. 6 comprises for example a fiber composite material. The winding form 340 does not have to be removed from the inner blade portion but can remain therein. Accordingly the winding form 340 represents a lost winding form because it remains in the inner blade portion.

The winding form 340 has a first end 341 and a second end 342 as well as a steel connection 344, by way of which the winding form is connected to a bearing 340*a*. The bearing 340*a* can be provided on a foundation 400. The winding form 340 can for example have a plurality of transverse stiffening members 343. By virtue of the fact that the winding form 340 does not have to be removed from the blade portion the first end 211 of the inner blade portion 210 can be wider so that a flange thickening configuration for example for making transverse bolt connections can be provided. The material of the inner blade portion 210 can be wound on to the winding form 340. The winding form 340 can be coupled to a second winding form 320 for example by way of a screw connection. In that case that second winding form 320 corresponds to the winding form 320 shown in FIG. 2. That winding form is intended in particular to produce a sleeve shape for the inner blade. After the inner blade portion 210 has been produced the second sleeve form 320 can be removed by releasing the screw connections. Optionally the steel connection 344 can remain in the winding form 340 or removed.

Figure 7:
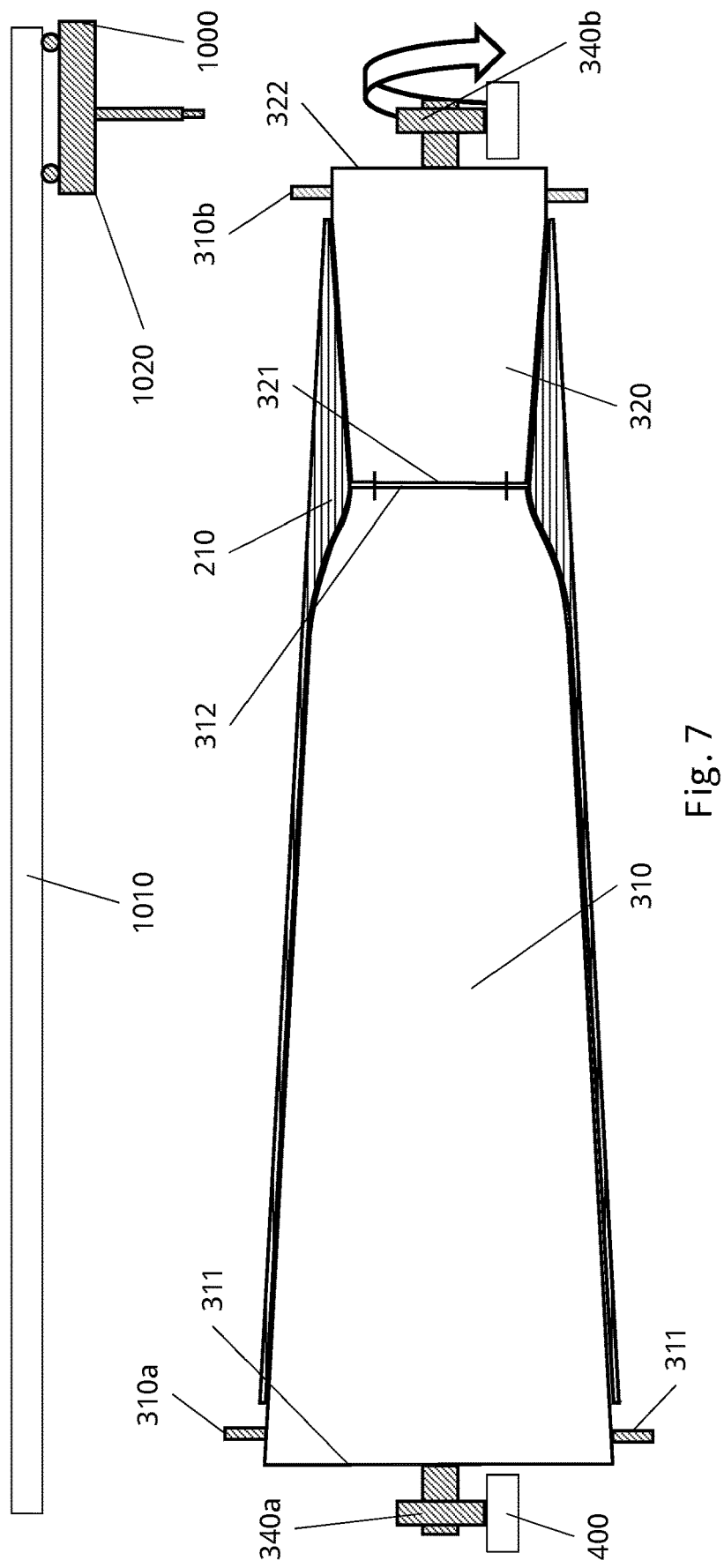
FIG. 7 shows a diagrammatic sectional view of an inner blade portion during manufacture thereof.
Figure 8:
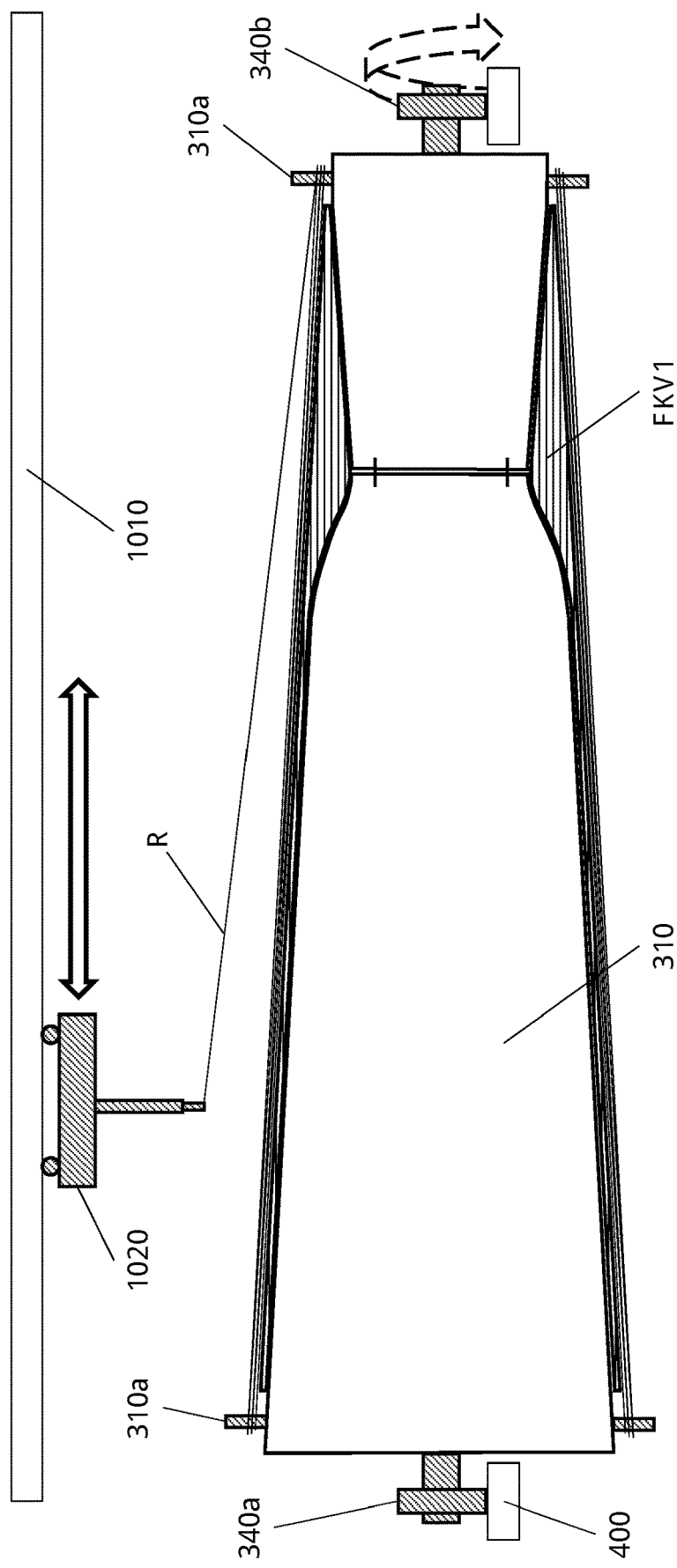
FIG. 8 shows a diagrammatic sectional view of an inner blade portion during manufacture thereof.

FIG. 7 shows a diagrammatic sectional view of an inner blade portion during manufacture thereof. FIG. 7 shows in particular how the material is wound on to the winding form 310, 320. Optionally the winding form 310 can have studs 310*a* and the second winding form 320 can have studs 310*b*. Therefore, a winding laminate can be applied to the winding form.

After a first layer of winding laminate has been applied to the winding form at least one layer of unidirectional (UD) rovings can be applied. In that case the rovings can be applied around the studs 310*a*, 310*b*.

Optionally the outside of the first winding laminate layer can be of a substantially straight configuration so that the unidirectional UD rovings can be simply placed thereon.

Figure 9:
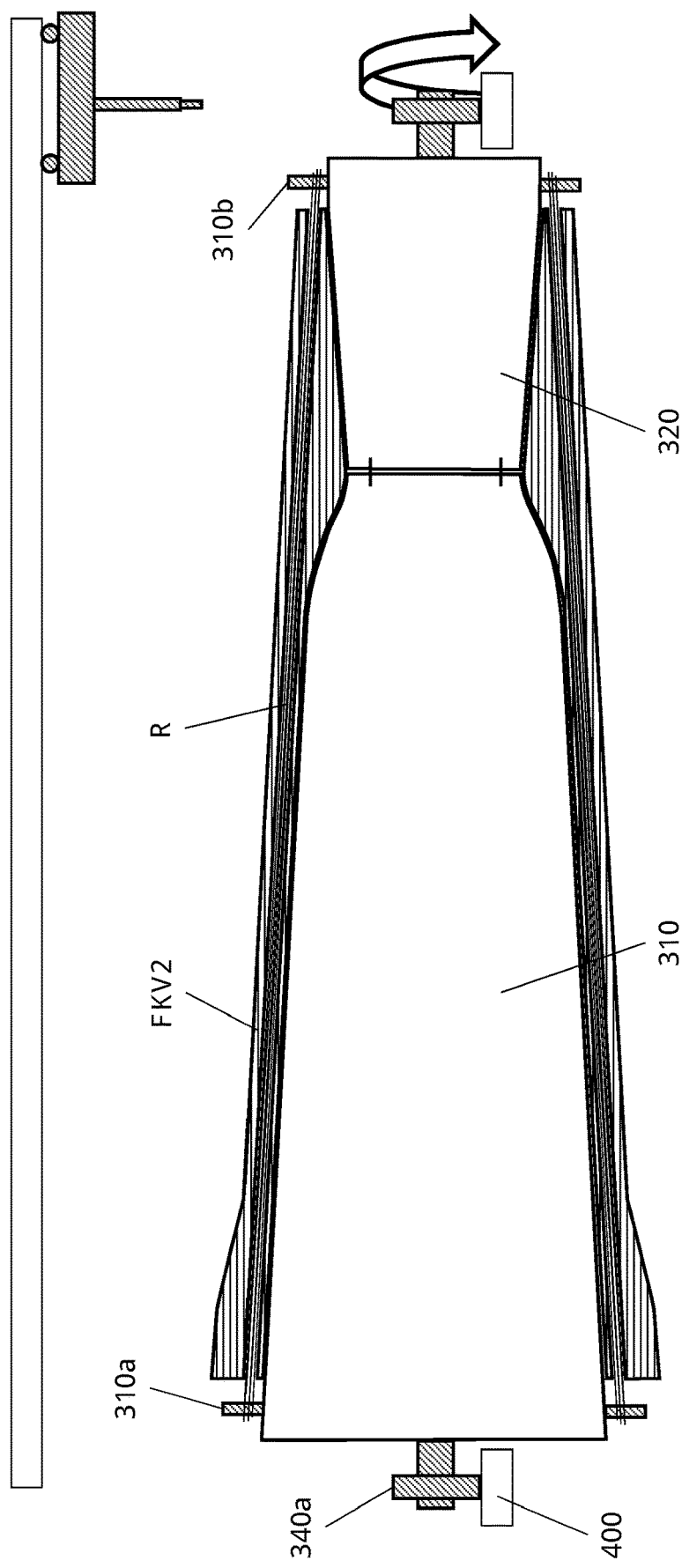
FIG. 9 shows a diagrammatic sectional view of an inner blade portion during manufacture thereof.

FIG. 9 shows a diagrammatic sectional view of an inner blade portion during manufacture thereof.

Figure 10:
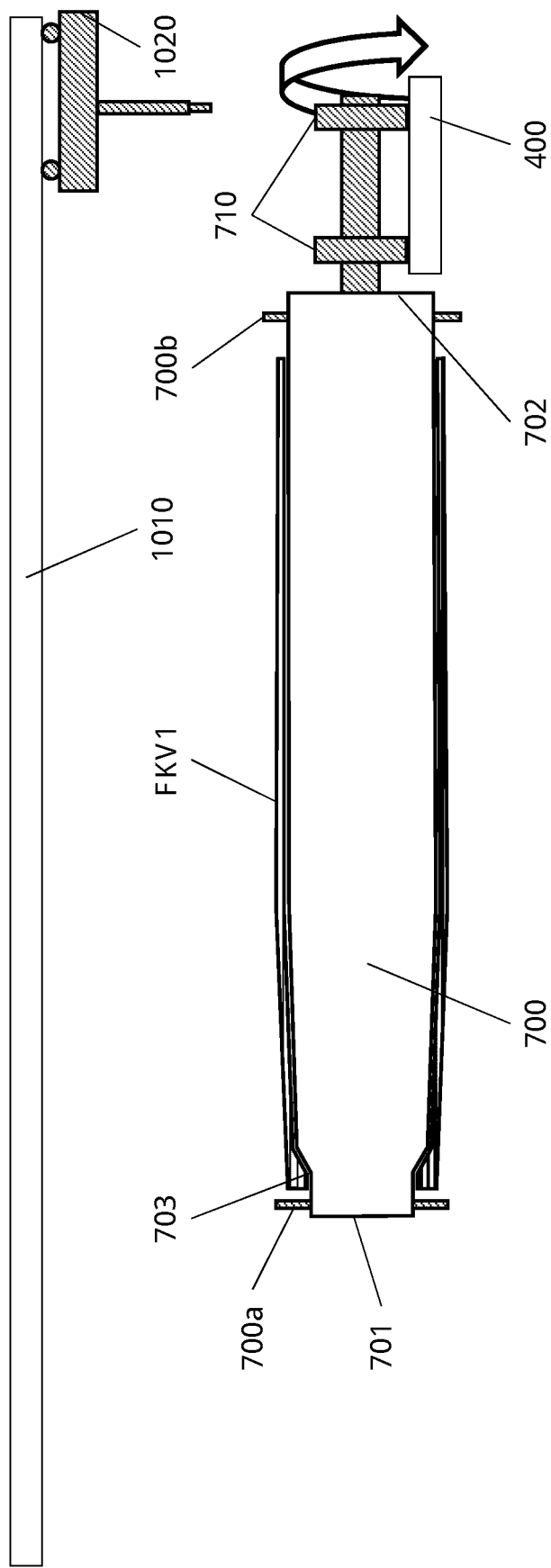
FIG. 10 shows a diagrammatic sectional view of the connecting element during manufacture thereof.

FIG. 10 shows a diagrammatic sectional view of the connecting element during manufacture thereof.

Figure 11:
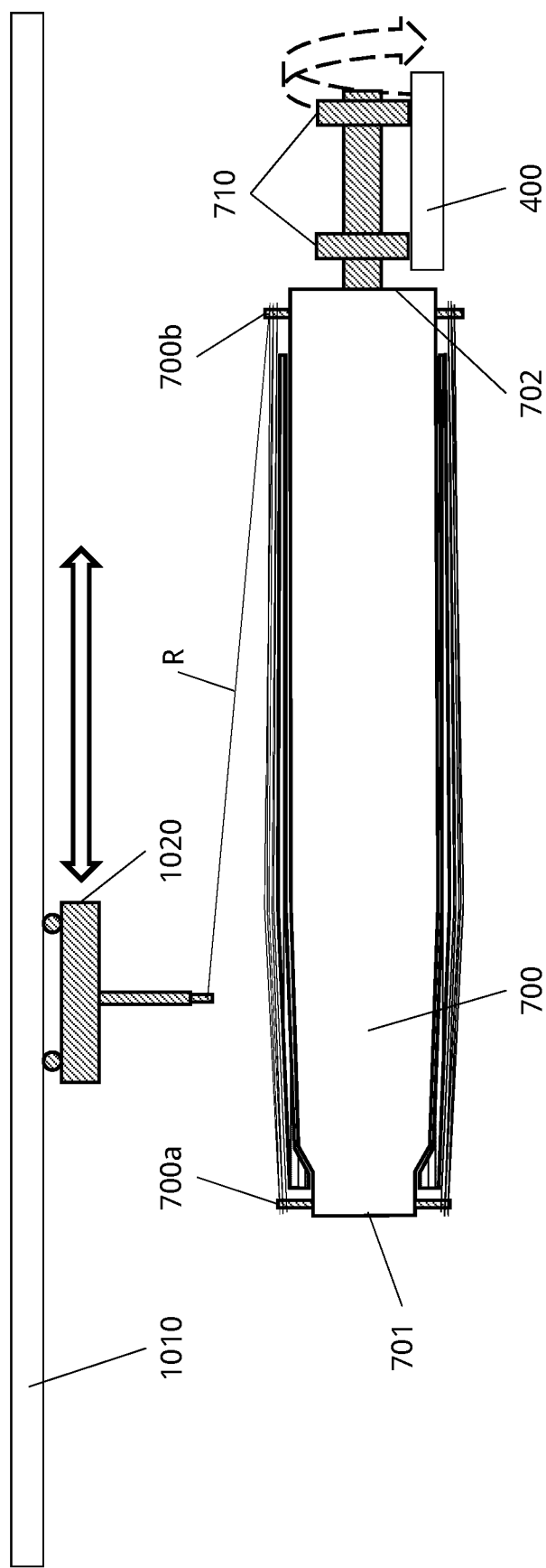
FIG. 11 shows a further diagrammatic sectional view of a connecting element during manufacture thereof.
Figure 12:
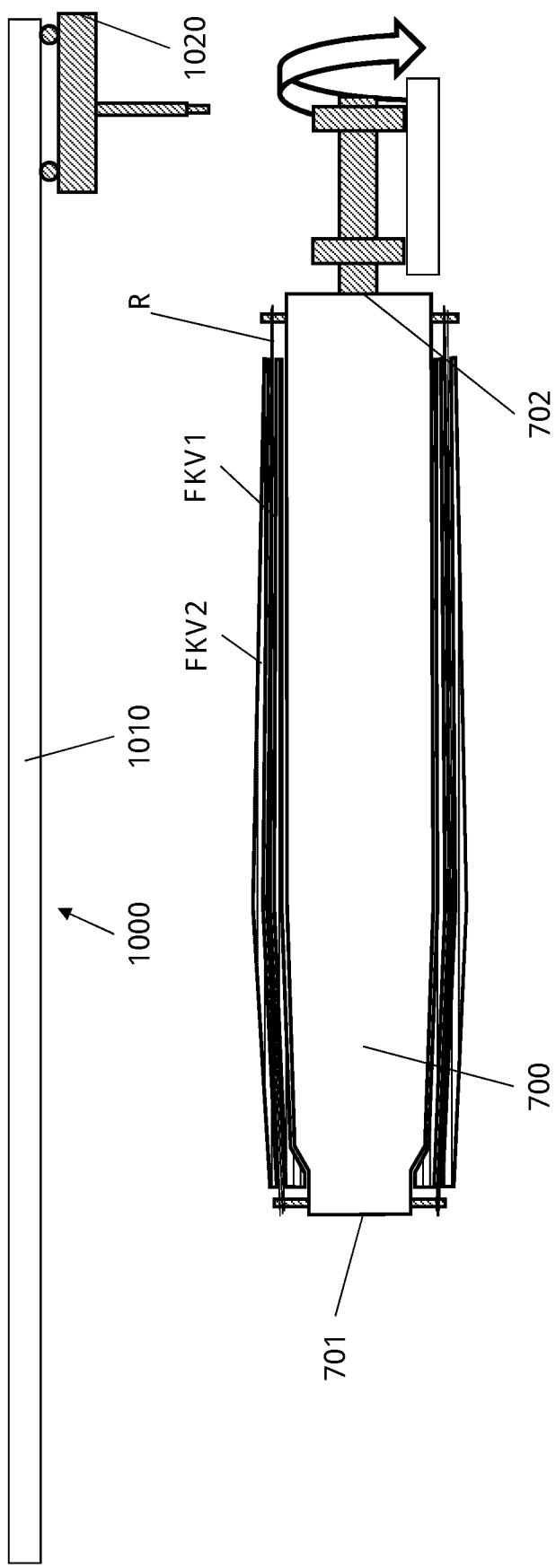
FIG. 12 shows a further diagrammatic sectional view of a connecting element during manufacture thereof.

FIGS. 10 to 12 show in particular the production of the connecting element 600. A first layer of winding laminate FKV1 is applied to the winding form 700 so that a straight line is provided at the outside. Unidirectional UD rovings can be provided thereon by means of the rovings. In particular the rovings can be wound around the studs 700*a*, 700*b*. A second layer of winding laminate FKV can then be applied.

The invention claimed is:

1. A method of producing a wind turbine rotor blade comprising an inner blade portion and an outer blade portion, the method comprising:
    forming the inner blade portion by winding composite fabrics on a first winding form, the first winding form having a first winding portion configured to separate from a second winding portion, wherein the first and second winding portions are fixed to each other in a longitudinal direction,
    wherein the second winding portion is of a conical configuration in the longitudinal direction so that after the winding composite fabrics, a sleeve is formed at an end of the inner blade portion, and
    winding laminate on a second winding form to form a connecting element, wherein the connecting element is configured to connect the inner blade portion and the outer blade portion together, wherein the connecting element has a first portion and a second portion, and
    wherein a form having a conical shape is pushed on to the first portion of the connecting element before the winding laminate is hardened in order to provide a first portion of a conical configuration.

2. The method according to claim 1 further comprising releasably connecting the inner blade portion and the outer blade portion together using the connecting element.

3. The method according to claim 1 further comprising connecting the inner blade portion and the outer blade portion together using the connecting element and adhesive.

* * * * *